(12) United States Patent
Rogan

(10) Patent No.: US 9,621,716 B2
(45) Date of Patent: Apr. 11, 2017

(54) METHOD AND SYSTEM FOR SECURE PROVISIONING OF A WIRELESS DEVICE

(75) Inventor: Michael John Rogan, Kitchener (CA)

(73) Assignee: BlackBerry Limited, Waterloo (CA)

(*) Notice: Subject to any disclaimer, the term of this patent is extended or adjusted under 35 U.S.C. 154(b) by 774 days.

(21) Appl. No.: 12/797,732

(22) Filed: Jun. 10, 2010

(65) Prior Publication Data

US 2011/0305338 A1 Dec. 15, 2011

(51) Int. Cl.
*H04L 29/06* (2006.01)
*H04M 3/42* (2006.01)
*H04W 12/02* (2009.01)
*H04W 12/10* (2009.01)

(52) U.S. Cl.
CPC ....... *H04M 3/42144* (2013.01); *H04W 12/02* (2013.01); *H04L 63/0428* (2013.01); *H04L 63/126* (2013.01); *H04W 12/10* (2013.01)

(58) Field of Classification Search
CPC H04L 12/2426; H04L 63/0428; H04L 63/216
USPC .......................................... 380/278; 455/410
See application file for complete search history.

(56) References Cited

U.S. PATENT DOCUMENTS

| | | | |
|---|---|---|---|
| 6,466,779 B1 * | 10/2002 | Moles et al. | 455/410 |
| 6,628,934 B2 | 9/2003 | Rosenberg et al. | |
| 2004/0107366 A1 | 6/2004 | Balfanz et al. | |
| 2008/0165943 A1 | 7/2008 | Gonzalez Lopez et al. | |
| 2008/0167060 A1 * | 7/2008 | Moshir et al. | 455/466 |
| 2009/0068999 A1 | 3/2009 | Chen et al. | |
| 2009/0082635 A1 * | 3/2009 | Baldus et al. | 600/300 |
| 2009/0247124 A1 * | 10/2009 | de Atley et al. | 455/410 |
| 2010/0048217 A1 * | 2/2010 | Deshpande et al. | 455/446 |
| 2010/0146057 A1 * | 6/2010 | Abu-Hakima et al. | 380/282 |
| 2010/0167696 A1 | 7/2010 | Smith et al. | |

FOREIGN PATENT DOCUMENTS

| | | |
|---|---|---|
| EP | 1195965 | 4/2002 |
| GB | 2414138 | 11/2005 |
| GB | 2414138 A | 11/2005 |
| WO | WO00/38437 | 6/2000 |

(Continued)

OTHER PUBLICATIONS

Menezes A et al: "Handbook of Applied Cryptography, Challenge-response identification (strong authentication)", Jan. 1, 1997 (Jan. 1, 1997), Handbook of Applied Cryptography; [CRC Press Series on Discrete Mathematices and Its Applications], CRC Press, Boca Raton, FL, US, pp. 397-399, XP002605905.

(Continued)

*Primary Examiner* — Brandon Hoffman
*Assistant Examiner* — Thong Truong
(74) *Attorney, Agent, or Firm* — Ridout and Maybee LLP

(57) ABSTRACT

A method and system for enabling one or more communication services on a wireless device are provided. The method comprises: sending a request for provisioning information from a carrier provisioning system to a device developer provisioning system; receiving, from the device developer provisioning system, secure provisioning information corresponding to the request; and sending the secure provisioning information corresponding to the request from the carrier provisioning system to the wireless device.

25 Claims, 6 Drawing Sheets

(56) References Cited

FOREIGN PATENT DOCUMENTS

WO    WO2009/002042    12/2008

OTHER PUBLICATIONS

European Search Report dated Nov. 23, 2010.
European Patent Office, "Summons to Attend Oral Proceedings Pursuant to Rule 115(1) EPC" for corresponding European Patent Application No. 10165524.9 dated Mar. 30, 2015, Germany.
Canadian Intellectual Property Office, Requisition by the Examiner in Accordance with Subsection 30(2) of the Patent Rules dated Jan. 16, 2015 in respect of CA Application No. 2,742,363.
Tam, Allan—Canadian Intellectual Property Office, "Examiner's Requisition" for corresponding Canadian Patent Application No. 2,742,363, dated Nov. 30, 2015.

* cited by examiner

METHOD AND SYSTEM FOR SECURE PROVISIONING OF A WIRELESS DEVICE

TECHNICAL FIELD

The present disclosure relates generally to wireless communication networks and, more particularly to network service provisioning to enable a wireless device for network services.

BACKGROUND

Wireless communication devices often provide multiple forms of communication. For example, such devices may provide for core communication services, such as voice communication services. Such devices may also provide for additional value added services. The value added services may include, for example, the ability to send and receive emails, the ability to interact with websites accessible through the Internet, the ability to send and receive instant messages, etc.

Core communication services may be provided by a wireless carrier. The wireless carrier is a mobile network operator which provides voice services to the wireless devices. Value added services may be provided by a third party value added service provider ("VASP"), such as, for example, a manufacturer or developer of the wireless device.

Core communication services and value added services are often provided on a service contract basis where a subscriber (i.e. a wireless device user or someone on behalf of the ultimate user) enters into a service contract with the wireless carrier and/or the value added service provider. In order to enable core communication services and/or value added services on the device, the device may need to be provisioned. Provisioning is the process of preparing and equipping a network to allow it to provide new services to its users. Provisioning may require provisioning information, such as for example, service books, to be provided to the wireless device. Service books contain information regarding how the wireless device will connect with a wireless carrier or value added service provider servers in order to enable features and functions on the wireless device.

BRIEF DESCRIPTION OF THE DRAWINGS

Embodiments will now be described by way of example with reference to accompanying figures, wherein.

Like reference numerals are used in the drawings to denote like elements and features.

DETAILED DESCRIPTION OF EXAMPLE EMBODIMENTS

In one aspect, the present application provides a method of enabling one or more communication services on a wireless device. The method comprises: sending a request for provisioning information from a carrier provisioning system to a device developer provisioning system; receiving, from the device developer provisioning system, secure provisioning information corresponding to the request; and sending the secure provisioning information corresponding to the request from the carrier provisioning system to the wireless device.

In another aspect, the present application comprises a method of enabling one or more communication services on a wireless device. The method comprises: receiving, at a device developer provisioning system, a request from a carrier provisioning system for provisioning information to provision the wireless device, the carrier provisioning system being connected to the wireless device through a wireless network; generating provisioning information using a private algorithm on the device developer provisioning system; securing the provisioning information to produce secure provisioning information; and sending the secure provisioning information from the device developer provisioning system to the carrier provisioning system for transmission to the wireless device.

In yet another aspect, the present application comprises a system for enabling one or more value added services on a wireless device. The system comprises a carrier provisioning system. The carrier provisioning system includes a first communication system for communicating with at least one wireless device and a second communication system for communicating with a device developer provisioning system. The carrier provisioning system also includes at least one processor which is configured to: send a request for provisioning information to a device developer provisioning system; receive, from the device developer provisioning system, secure provisioning information corresponding to the request; and send the secure provisioning information corresponding to the request from the carrier provisioning system to the wireless device.

Other aspects of the present application will be apparent to those of ordinary skill in the art from a review of the following detailed description in conjunction with the drawings.

Example embodiments of the present application are not limited to any particular operating system, wireless device architecture, server architecture, or computer programming language.

Figure 1:
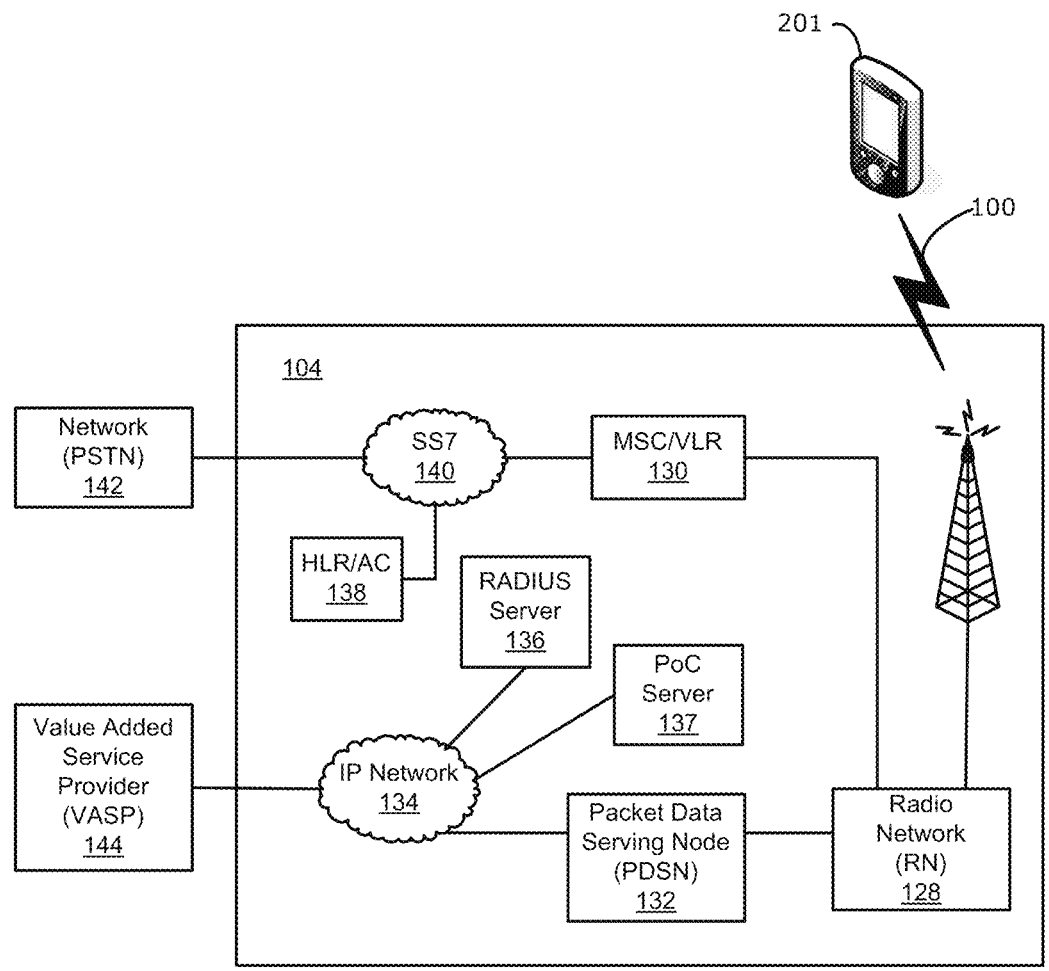
FIG. 1 is a block diagram illustrating example embodiments of a wireless communication network and a wireless device.

Reference is now made to FIG. 1, which illustrates a block diagram of a communication network 104 in which example embodiments of the present disclosure may operate. One or more wireless devices 201 communicate in and through the wireless communication network 104. In the embodiment of FIG. 1, the wireless communication network 104 is a Third Generation (3G) supported network based on Code Division Multiple Access (CDMA) technologies. In particular, the wireless communication network 104 is a CDMA2000 network which includes fixed network components as shown in FIG. 1. The wireless communication network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. The SS7 network 140 is communicatively coupled to a network 142 (such as a Public Switched Telephone Network or PSTN), whereas IP network 134 is communicatively coupled to another network (such as the Internet).

The wireless communication network 104 is operated by a wireless carrier. The wireless carrier is a mobile network operator, such as a telephone company which provides services for mobile phone subscribers. In at least some embodiments, the wireless carrier provides a service or a set of services which may be referred to as core services. Such services may, for example, include voice communication services. Other core services may also be provided for by the wireless carrier.

In some embodiments, to expand the communication functionality of the wireless devices 201, the IP network 134 may allow the wireless device 201 to access one or more value added service provider (VASP) 144 and to access value added services provided by the VASP 144. Value added services are non-core services. Value added services may include, for example, instant messaging services (which permit the wireless device 201 to send and receive instant messages), email services (which permit the wireless device 201 to send and receive email messages, Internet services (which may, among other things, permit the wireless device 201 to browse the Internet through an Internet browser).

In various embodiments, short message service (SMS) communications and/or multimedia messaging service messages (MMS) may be considered either a core service provided by the wireless carrier or a value added service provided by the VASP 144.

The VASP 144 is in at least some embodiments, a third party provider. That is, the VASP 144 is not the wireless carrier. In some embodiments, the VASP 144 may be the manufacturer or developer of the wireless device 201. Some of the value added services may be provided by the third party provider on a subscription basis. That is, a value added service provider may receive a subscription fee from the wireless carrier or from a user associated with the wireless device 201 directly for the use of the value added services.

The wireless communication network 104 of FIG. 1 is exemplary and persons of ordinary skill in the art will appreciate that other wireless network architectures and standards may be used.

During operation, the wireless device 201 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from wireless devices 201 within its cell. The base station transceiver system normally performs such functions as modulation and possibly encoding and/or encryption of signals to be transmitted to the wireless device in accordance with communication protocols and parameters, under control of its controller. The base station transceiver system similarly demodulates and possibly decodes and decrypts, if necessary, any communication signals received from a wireless device 201 within its cell. Communication protocols and parameters may vary between different networks. For example, one network may employ a different modulation scheme and operate at different frequencies than other networks. The underlying services may also differ based on its particular protocol revision.

A wireless link 100 connecting the wireless device 201 to the network 104 shown in the communication system of FIG. 1 represents one or more different channels, typically different radio frequency (RF) channels, and associated protocols used between the wireless communication network 104 and the wireless device 201. An RF channel is a limited resource that must be conserved, typically due to limits in overall bandwidth and a limited battery power of wireless devices 201. Those skilled in the art will appreciate that a wireless communication network in actual practice may include hundreds of cells depending upon desired overall expanse of network coverage. Pertinent components may be connected by multiple switches and routers (not shown), controlled by multiple network controllers.

For all wireless devices 201 registered with a network operator (such as a wireless carrier), permanent data (such as wireless device 201 user's profile) as well as temporary data (such as a wireless device's 201 current location) are stored in a HLR/AC 138. In case of a voice call to the wireless device 201, HLR/AC 138 is queried to determine the current location of the wireless device 201. A Visitor Location Register (VLR) of MSC 130 is responsible for a group of location areas and stores the data of those wireless devices 201 that are currently in its area of responsibility. This includes parts of the permanent wireless device data that have been transmitted from HLR/AC 138 to the VLR for faster access. However, the VLR of MSC 130 may also assign and store local data, such as temporary identifications. The wireless device 201 is also authenticated on system access by HLR/AC 138. In order to provide packet data services to the wireless device 201 in a CDMA2000-based network, RN 128 communicates with PDSN 132. PDSN 132 may provide access to the Internet (or intranets, Wireless Application Protocol (WAP) servers, etc.) through IP network 134. In the embodiment shown, the PDSN 132 provides access to a value added service provider (VASP) 144 which may, in turn, provide access to value added services such as the Internet, etc. That is, the VASP acts as a gateway.

PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

The wireless communication network 104 also includes a Push-to-talk over Cellular (PoC) server 137 which may be coupled to IP network 134. PoC server 137 operates to facilitate PoC individual and group communication sessions between wireless devices within network 104. A conventional PoC communication session involves a session connection between end users of wireless devices, referred to as session "participants", who communicate one at a time in a half-duplex manner much like conventional walkie-talkies or two-way radios.

Those skilled in the art will appreciate that the wireless communication network 104 may be connected to other systems, possibly including other networks, not explicitly shown in FIG. 1. The network may transmit paging and system information on an ongoing basis, even if there is no actual packet data exchanged. Although the network consists of many parts, these parts all work together to result in certain behaviors at the wireless link. Though a CDMA wireless communication network 104 is described, the wireless communication network 104 may conform to any of the wireless network technologies and protocols including cellular, wide-area network (WAN), Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks.

The wireless devices 201 operating within the communication network 104 may be equipped for use with various services. As noted previously, such services may include services which are provided by a wireless carrier. In at least some embodiments, the wireless carrier provides a service or a set of services which may be referred to as core services. Such services may, for example, include voice communication services. Other core services may also be provided for by the wireless carrier.

In at least some embodiments, the wireless devices 201 may also be equipped for use with value added services. Value added services are non-core services which are provided, at least in part, by a value added service provider. Value added services may include, for example, instant messaging services (which permit the wireless device 201 to send and receive instant messages), email services (which permit the wireless device 201 to send and receive email messages, Internet services (which may, among other things, permit the wireless device 201 to browse the Internet through an Internet browser), etc.

Figure 2:
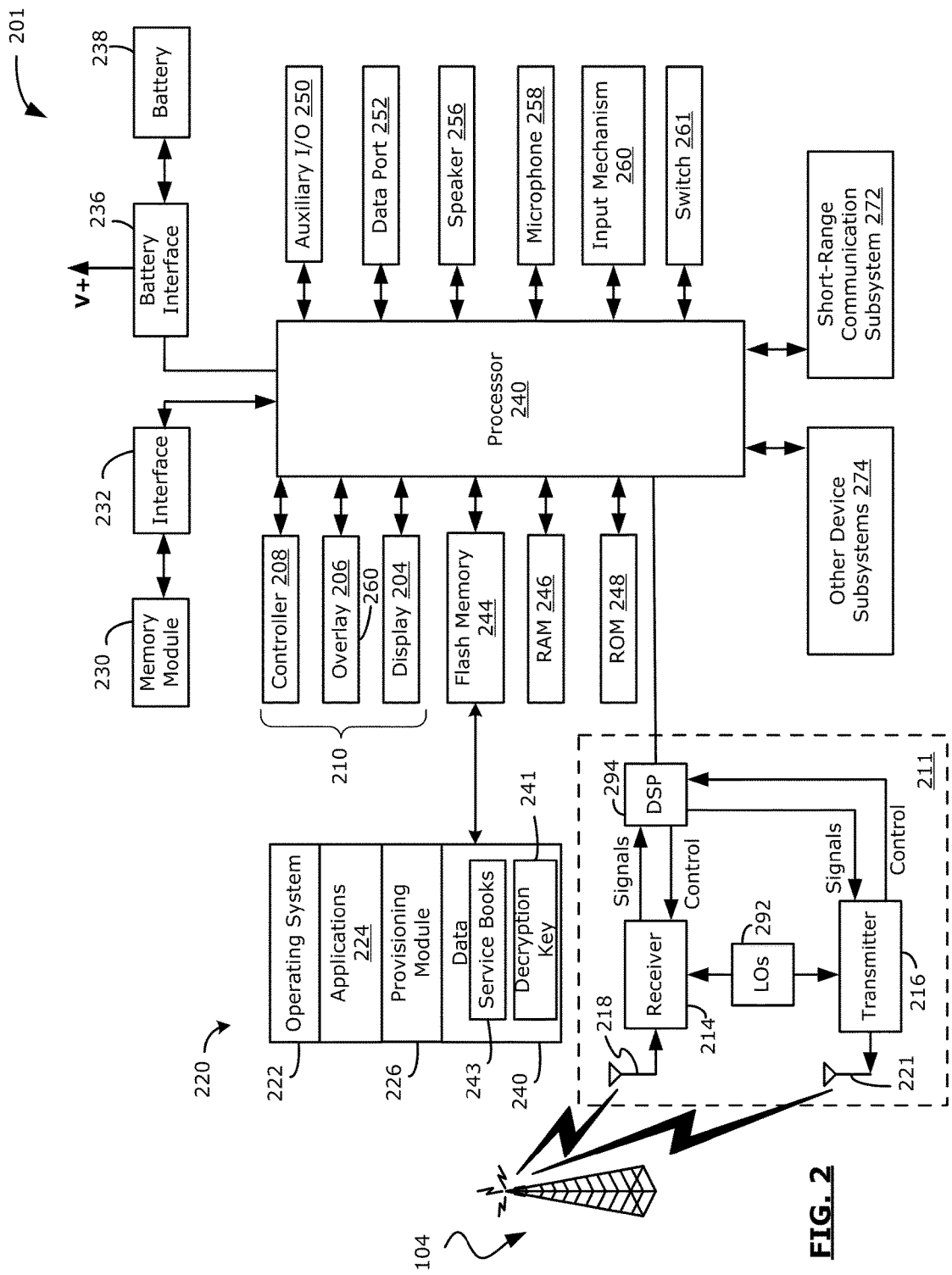
FIG. 2 is a block diagram illustrating a wireless device in accordance with example embodiments of the present disclosure.

Reference is now made to FIG. 2 which illustrates a block diagram of a wireless device 201 in which example embodiments described in the present disclosure can be applied. The wireless device 201 may, in various example embodiments, also be referred to as a mobile device, a mobile communication device, an electronic device and/or a device. In the example embodiment shown, the wireless device 201 is a two-way mobile communication device having data and voice communication capabilities, and the capability to communicate with other computer systems, for example, via the Internet. Depending on the functionality provided by the wireless device 201, in various example embodiments the wireless device 201 may be a data communication device, a multiple-mode communication device configured for both data and voice communication, a smartphone, a mobile telephone or a PDA (personal digital assistant) enabled for wireless communication, or a computer system with a wireless modem.

The wireless device 201 includes at least one controller comprising at least one processor 240 such as a microprocessor which controls the overall operation of the wireless device 201, and a wireless communication subsystem 211 for exchanging radio frequency signals with a wireless communication network 104. The processor 240 interacts with the communication subsystem 211 which performs communication functions. The processor 240 interacts with additional device subsystems. In some example embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 provide a touch-sensitive input device and the processor 240 interacts with the touch-sensitive overlay 206 via the electronic controller 208. The touch-sensitive overlay 206 acts as an input mechanism 260, allowing the user of the device 201 to input commands to the processor 240. In other example embodiments, the display 204 may not be a touchscreen display. Instead, the device 201 may simply include a non-touch display and one or more other input mechanisms 260, such as, for example, a depressible scroll wheel, track pad, joy stick, or track ball. In some example embodiments, the device 201 may have a touchscreen display 210 and also other input mechanisms 260.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, input mechanisms 260, switch 261, short-range communication subsystem 272, and other device subsystems generally designated as 274. Some of the subsystems shown in FIG. 1 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 292, and a processing module such as a digital signal processor (DSP) 294. The antenna elements 218 and 221 may be embedded or internal to the wireless device 201 and a single antenna may be shared by both receiver and transmitter, as is known in the art. As will be apparent to those skilled in the field of communication, the particular design of the communication subsystem 211 depends on the wireless communication network 104 in which the wireless device 201 is intended to operate.

The wireless device 201 may communicate with any one of a plurality of fixed transceiver base stations of the wireless communication network 104 within its geographic coverage area. The wireless device 201 may send and receive communication signals over the wireless communication network 104 after network registration or activation procedures have been completed (these procedures may also be referred to as provisioning procedures). Signals received by the antenna 218 through the wireless communication network 104 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 294. In a similar manner, signals to be transmitted are processed, including modulation and encoding, for example, by the DSP 294. These DSP-processed signals are input to the transmitter 216 for digital-to-analog (D/A) conversion, frequency up conversion, filtering, amplification, and transmission to the wireless communication network 104 via the antenna 221. The DSP 294 not only processes communication signals, but may also provide for receiver and transmitter control. For example, the gains applied to communication signals in the receiver 214 and the transmitter 216 may be adaptively controlled through automatic gain control algorithms implemented in the DSP 294.

The processor 240 operates under stored program control and executes software modules 220 stored in a persistent memory; for example, in the flash memory 244. As illustrated in FIG. 1, the software modules 220 comprise operating system software 222 and other local applications 224. In at least some embodiments, the software modules 220 include a provisioning module 226. As will be explained in greater detail with respect to FIGS. 3 to 6, the provisioning module 226 is configured to send and receive data, such as provisioning information to and from a carrier provisioning system and/or a value added service provisioning system.

In some embodiments, the provisioning module 226 may be a sub-module included within another application or module, such as, for example, the operating system 222 or the local applications 224. In other embodiments, the provisioning module 226 may be a standalone module or application.

In at least some embodiments, the provisioning module 226 receives provisioning information, such as one or more service books 243 from a provisioning system such as a carrier provisioning system and/or a value added service provisioning system. The provisioning module 226 may implement received provisioning information on the wireless device 201. For example, the provisioning module 226 may store the provisioning information to a data area 240 of the memory 244. The provisioning module 226 is, in at least some embodiments, configured to initiate provisioning of the wireless device 201 in response to the occurrence of one or more trigger conditions. For example, in some embodiments, the provisioning module 226 is configured to initiate provisioning of the wireless device 201 in response to a first start-up of the wireless device 201. In other embodiments, the provisioning module 226 is configured to initiate provisioning if the wireless device 201 is not already provisioned.

Those skilled in the art will appreciate that the software modules 220, such as the provisioning module, or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The local software applications 224 may also include a range of other applications, including, for example, an address book application, a messaging application, a calendar application, and/or a notepad application. One or more of the applications 224 may require value added services provided by a value added service provider in order to use such services. In some example embodiments, the local software applications 224 include an email message application, a push content viewing application, a voice communication (i.e. telephony) application, a map application, and a media player application. Each of the local software applications 224 may include layout information defining the placement of particular fields and graphic elements (e.g. text fields, input fields, icons, etc.) in the user interface (i.e. the display device 204) according to the application.

In some example embodiments, the auxiliary input/output (I/O) subsystems 250 may comprise an external communication link or interface; for example, an Ethernet connection. The wireless device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the wireless device 201 such as receipt of an electronic communication or incoming phone call, or for other purposes such as haptic feedback (e.g. touch feedback).

The wireless device 201 may also include a memory module 230, such as a Subscriber Identify Module or "SIM" card or a Removable User Identity Module (R-UIM), to be inserted in or connected to a storage memory interface 232 of the wireless device 201. Alternatively, memory module 230 may be a non-volatile memory which may be programmed with configuration data by a wireless carrier so that mobile device 202 may operate in the network.

The storage memory 230 and/or memory 244 may store data 240. As noted previously, in some example embodiments, the data 240 may include provisioning information, such as service books 243 including information required by the wireless device 201 to establish and maintain communication with the wireless communication network 104 and/or to receive services provided by a value added service provider 144 (FIG. 1).

The data 240 may also include user application data (not shown) such as email messages, address book and contact information, calendar and schedule information, notepad documents, image files, and other commonly stored user information stored on the wireless device 201 by its user, and other data.

The data 240 may also include a decryption key 241 associated with the wireless device 201. The decryption key 241 may be a private key which may be used by the wireless device 201 to decrypt data, such as provisioning information, which has been encrypted with an associated public key. In other embodiments, the decryption key 241 may be a private encryption/decryption key which may be shared with a trusted system, such as a device developer provisioning system or a value added service provisioning system and used by the device to decrypt encrypted messages received from such provisioning systems.

Referring still to FIG. 2, the serial data port 252 may be used for synchronization with a user's host computer system (not shown). The serial data port 252 enables a user to set preferences through an external device or software application and extends the capabilities of the wireless device 201 by providing for information or software downloads to the wireless device 201 other than through the wireless communication network 104. The alternate download path may, for example, be used to load the decryption key 241 onto the wireless device 201 through a direct, reliable and trusted connection to thereby provide secure device communication.

In some example embodiments, the wireless device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their wireless device 201 to the host computer system via a USB cable or Bluetooth® connection, traffic that was destined for the wireless communication network 104 is automatically routed to the wireless device 201 using the USB cable or Bluetooth® connection. Similarly, any traffic destined for the wireless communication network 104 is automatically sent over the USB cable Bluetooth® connection to the host computer system for processing.

The wireless device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the wireless device 201, and the battery interface 236 provides a mechanical and electrical connection for the battery 238. The battery interface 236 is coupled to a regulator (not shown) which provides power V+ to the circuitry of the wireless device 201.

The short-range communication subsystem 272 is an additional optional component which provides for communication between the wireless device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

The wireless device 201 may, in some example embodiments, provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 210. A user of the wireless device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless communication network 104.

In the voice communication mode, the wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the wireless device 201. Although voice or audio signal output is typically accomplished primarily through the speaker 256, the display 204 may also be used to provide an indication of the identity of a calling party, duration of a voice call, or other voice call related information.

In order to use services provided by a wireless carrier, the wireless device 201 may undergo a carrier provisioning procedure. Carrier provisioning is a process of preparing and equipping a network and wireless device 201 to allow the wireless device 201 to receive services provided by the wireless carrier. Similarly, in order to use value added services, value added service provisioning of the wireless device 201 may be required. Value added service provisioning is the process of preparing and equipping the wireless device 201 and, in some embodiments, the value added service provider 144 (FIG. 1) system to allow the wireless device 201 to receive services provided by the value added service provider 144 (FIG. 1) system.

During the value added service provisioning procedure and/or the carrier provisioning procedure, provisioning information may be transferred from a value added service provisioning system and/or a carrier provisioning system for storage on the wireless device 201. The provisioning information may include information (such as service books 243) that is used by the wireless device 201 to enable the wireless device 201 to receive the service (either the core service or the value added service as the case may be).

The provisioning information may, in at least some embodiments, include updated operated parameters which may be used by the wireless device 201 to update one or more parameters on the device from default values. In such embodiments, the wireless device 201 may include one or more default parameters, which may be preloaded onto the device at the time of manufacture of the wireless device. By way of example, one or more parameters may be a value associated with a timer of the device 201. The provisioning information may, in at least some embodiments, update one or more of the parameters from default values.

The provisioning information may, in some embodiments, include a software patch for the wireless device 201. The software patch may provide computer readable instructions to the device 201 to update software installed on the device prior to sale of the device. For example, in some embodiments, the software installed on the device 201 may contain errors, such as programming errors. The software patch may correct such errors on the device.

Where the provisioning information is generated by the value added service provider (i.e., by a provisioning system associated with the VASP), the provisioning information may be referred to as value added service provisioning information. Similarly, provisioning information that is generated by the wireless carrier (i.e., by a provisioning system associated with the carrier) may be referred to as carrier provisioning information. Carrier provisioning information and value added service provisioning information may be referred to, more generally, as provisioning information.

The provisioning information may, for example, include service books 243. Service books contain information regarding how the wireless device will connect with a wireless carrier or a value added service provider 144 in order to enable features and functions on the wireless device 201.

By way of example, the service books may include a service book 243 which contains routing information for an Internet browser service. That is, the service books 243 may include one or more service book 243 which is required for the wireless device 201 to use an Internet browsing service. The Internet browser service is, in some embodiments, a value added service which is provided by a value added service provider 144. The value added service provider 144 may, in some embodiments, provide Internet browser services through a gateway which is configured to process Internet content to reformat or compress such content to improve the viewing or transmission of such content. For example, in some embodiments, the gateway is configured to reduce the size of images and other content to reduce the bandwidth required to transmit content to the wireless device 201.

In some embodiments, the service books 243 may contain information that is required by the wireless device 201 to use a global address book service which permits the wireless device 201 to perform a global address book search of contact information (such as email addresses, telephone numbers, etc.) stored on a remote server. The global address book service may, in some embodiments, be a value added service that is provided by a value added service provider 144.

In some embodiments, the service books 243 may contain information that is required by the wireless device 201 to send and receive instant messages. That is, the service books 243 may include one or more service book 243 which is required by the wireless device 201 to use an instant messaging service. The instant messaging service may be a value added service that is provided by one or more value added service provider.

In some embodiments, the service books 243 may contain information that is required for a wireless calendar synchronization service which synchronizes information associated with a local calendar application on the wireless device 201 with a calendar stored on a remote computer or server. In at least some embodiments, the calendar synchronization service is provided by a value added service provider 144.

In some embodiments, the service books 243 may contain information that is required to send and/or receive email messages from the wireless device 201. That is, the service books 243 may include information that is required for the wireless device 201 to access an email service. The email service is, in some embodiments, provided by a value added service provider 144.

In some embodiments, the service books 243 may contain information that is required to send and/or receive multimedia messaging service (MMS) messages. That is, the service books 243 may contain information that is required for the wireless device 201 to use an MMS service. In some embodiments, the MMS service may be a core service which is provided by the wireless carrier. In other embodiments, the MMS service may be a value added service provided by a value added service provider 144.

In at least some embodiments, the service books 243 contain information that is required to send and/or receive short messaging service (SMS) messages. That is, the service books 243 may contain information that is required for the wireless device to use an SMS service. In some embodiments, the SMS service may be a core service which is provided by the wireless carrier. In other embodiments, the SMS service may be a value added service provided by a value added service provider 144.

Other service books 243 and services apart from those specifically described above may be included in other embodiments.

Service books 243 or other provisioning information received from a carrier provisioning system and/or a value added service provisioning system may be stored on the wireless device 201 by the provisioning module 226.

It will be appreciated that a manufacturer or developer of the wireless device 201 may wish to keep certain provisioning information or methods of generating provisioning information private. A device developer may wish to do so, for example, to prevent other parties from generating fake provisioning information to activate services on a device 201 which the device should not be authorized to activate. In other cases, a device developer may wish to keep such information secret so that the device developer maintains greater control over the methods and systems which are used to provision devices. That is, a device developer may wish to keep certain provisioning information (or methods of generating such provisioning information) secret from wireless carriers and others.

In such embodiments, public or private key encryption may be employed to transfer encrypted (or otherwise secure) data from a provisioning system operated by a device developer (which will also be referred to as a device developer provisioning system) to the wireless device 201. In such embodiments, the decryption key 241 on the wireless device 201 may be used to decrypt encrypted value added service provisioning information received from the value added provisioning system.

To provide even greater security, in at least some embodiments, provisioning information received from the device developer provisioning system is time and/or date stamped to indicate the time and/or the date when the information was generated and/or sent from the device developer provisioning system, the value added provisioning system and/or the carrier provisioning system. In such embodiments, the provisioning module 226 may be configured to ignore provisioning information if such information is determined, by the provisioning module 226, to be too old. The provisioning module 226 may make this determination by comparing a current time with the time included in the provisioning information. If the elapsed time between the time included in the provisioning information and the current time is greater than a predetermined threshold, then the provisioning module 226 may determine that the provisioning information is too old and may ignore such information (i.e. it will not permanently save such information to the memory 244).

In order to provide additional security, in some embodiments, the current time may be determined from a network time retrieved from the wireless communication network 104. Relying on the network time rather than the local wireless device 201 time may provide greater assurances that a user of the wireless device 201 has not adjusted the time on the wireless device 201 in order to dupe the system.

In at least some embodiments, the wireless device 201 is pre-programmed (for example, at the time of manufacture) with a network address (for example, a network address accessible through the IP Network 134 of FIG. 1). The network address is an address to which the wireless device 201 may connect in order to enable one or more value added services. For example, in some embodiments, the wireless device 201 has an IP address pre-programmed into memory. The wireless device 201 may connect to the IP address to enable one or more value added services.

In at least some embodiments, the network address which is pre-programmed into the device 201 may be replaced with a network address received as part of the provisioning process. That is, a new network address may be received at the wireless device 201 as part of the provisioning information and the provisioning module 226 may use the received network address instead of the pre-programmed network address in order to enable the value added services. This allows flexibility by allowing a network address to be varied after device manufacture.

Figure 3:
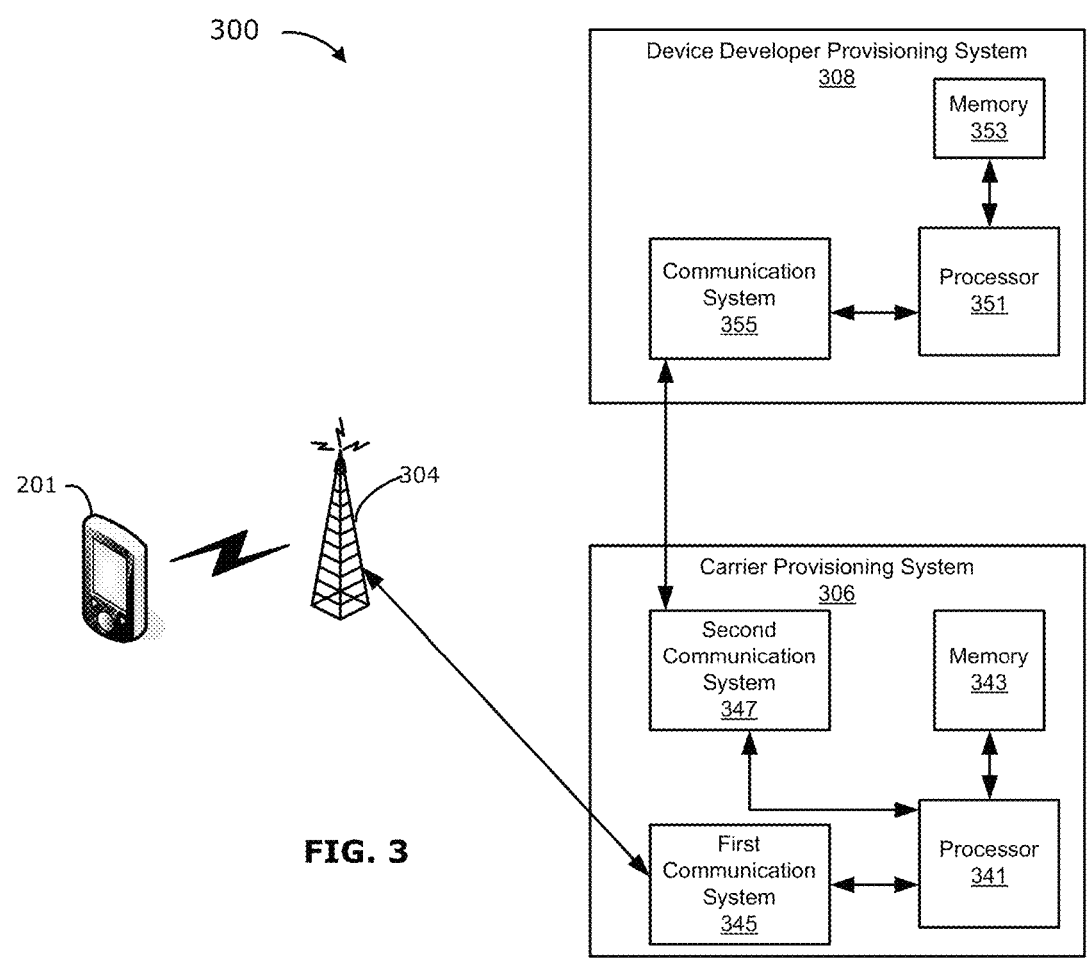
FIG. 3 is a block diagram of a provisioning system in accordance with example embodiments of the present disclosure.

Referring now to FIG. 3, a block diagram of a wireless device 201 provisioning system 300 is illustrated. The wireless provisioning system 300 provisions the wireless device 201. In the embodiment of FIG. 3, the wireless device 201 connects to a carrier provisioning system 306 via wireless network equipment 304. The wireless network equipment 304 of FIG. 3 is symbolized by a base station. However, the wireless network equipment 304 may include infrastructure such as a radio network 128 and packet data serving node 132 providing gateway services to bridge wire line and wireless communication networks. Wireless network equipment 304 communicates (data) wirelessly with the wireless device 201 and over a wire line network (public or private) with other components, such as the carrier provisioning system 306.

The carrier provisioning system 306 is configured to send and receive data to the wireless device 201 during a provisioning process. The provisioning process may be initiated, for example, when the wireless device 201 first connects to the wireless network equipment 304.

During the provisioning process, the carrier provisioning system 306 may wish to send provisioning information which is created using a method that is proprietary to the device developer to the wireless device 201. For example, in some embodiments, the carrier provisioning system 306 may want to change settings on the wireless device 201 from predefined defaults. For example, a wireless carrier may wish to vary the ping rate of the wireless device 201 to change a default ping rate set by a device developer. Alternatively, in some embodiments, the carrier provisioning system 306 may want to change a network address which the wireless device 201 must connect to in order to use one or more value added services.

Some changes may have adverse effects on the wireless device 201. For example, increasing the ping rate may result in a decreased battery life of the wireless device 201.

Since some such changes may have adverse effects on the wireless device 201 (and possibly for other reasons), the device developer may want to keep the methods or data required to implement such changes private. Doing so may allow the device developer greater control over the scope of changes made to the device 201.

Accordingly, in some embodiments, the carrier provisioning system 306 may be connected to a device developer provisioning system 308. The device developer provisioning system 308 is a system which contains methods for generating certain provisioning information for use in provisioning the wireless device 201. The methods are private algorithms which are unknown to the carrier provisioning system 306. The device developer provisioning system 308 is operated by the manufacturer and/or developer of the wireless device 201.

Accordingly, in at least some embodiments, the carrier provisioning system 306 may send a request to the device developer provisioning system 308 to request provisioning information (such as, for example, provisioning information instructing the wireless device 201 to vary a ping rate).

In some embodiments, the device developer provisioning system 308 may be configured to provide provisioning information of more than one type. For example, the device developer provisioning system 308 may be configured to provide provisioning information to vary a first setting associated with the wireless device (i.e. a ping rate) and provisioning information to vary a second setting associated with the wireless device. In such embodiments, the request from the carrier provisioning system 306 may include information which allows the device developer provisioning system 308 to determine the nature of the request. That is the request includes information which specifies the type of provisioning information that the carrier provisioning system 306 would like to receive from the device developer provisioning system 308.

The request may also include information which may be used by the device developer provisioning system 308 to generate provisioning information which is only usable by the specific wireless device 201 which is being provisioned. Such information may, for example, include identification information which identifies the wireless device 201.

The identification information may be an identification number (such as a personal identification number or PIN) or other identifier which is stored on the device at the time of manufacture of the wireless device 201.

In response to receiving the request, the device developer provisioning system 308 may generate provisioning information corresponding to the request and may secure such provisioning information to make such provisioning information only usable by the specific wireless device 201 associated with the request. It will be appreciated that securing the information in this manner may help to prevent someone from capturing this information and using this information in order to provision a further wireless device 201 with the same provisioning information.

In some embodiments, the provisioning information is secured by encrypting the provisioning information with an encryption key corresponding to the decryption key on the wireless device 201. However, other methods of securing the provisioning information may also be employed in other embodiments.

In some embodiments, public key encryption may be used by the device developer provisioning system 308 to encrypt provisioning information generated by the device developer provisioning system 308. In such embodiments, the request from the carrier provisioning system 306 may include an encryption key associated with the wireless device 201. The encryption key corresponds to a decryption key 241 (FIG. 2) on the wireless device 201. The carrier provisioning system 306 may receive the encryption key from the wireless device 201 and may send the encryption key to the device developer provisioning system 308.

In other embodiments, the device developer provisioning system 308 may retrieve an encryption key corresponding to the decryption key 241 (FIG. 2) on the wireless device 201 from a memory associated with the device developer provisioning system 308. The device developer provisioning system 308 may retrieve an encryption key corresponding to the decryption key using the identification information which is received with the request from the carrier provisioning system.

In such embodiments, the encryption key may be a public encryption key or a private encryption key which is known only to the device developer and the wireless device. The encryption key may be stored on memory 353 associated with the device developer provisioning system 308 prior to sale of the wireless device 201 to its end user. For example, the encryption key may be stored on the memory at the time of manufacture of the wireless device along with the associated identification information. Using identification information received from the carrier provisioning system, the device developer provisioning system 308 may look up the encryption key associated with that identification information in the memory 353.

Alternatively, or in addition to encryption, in some embodiments, the provisioning information may be signed using a digital signature. For example, the provisioning information generated by the device developer provisioning system 308 may be signed using a private key associated with the device developer provisioning system 308 to create signed provisioning information.

To provide even greater security, the device developer provisioning system 308 is, in some embodiments, configured to include a time and/or date stamp in the encrypted or otherwise secured provisioning information. The time and/or date stamp will, in some embodiments, indicate a time or date when the device developer provisioning system 308 handled the provisioning information. For example, in some embodiments, the time and/or date stamp will indicate the time and/or date when the provisioning information was generated. In such embodiments, the wireless device 201 may be configured to ignore provisioning information if the time and/or date stamp indicates that the provisioning information is too old.

In other embodiments, the time or date stamp may take the form of an expiry date and/or time. In such embodiments, the device developer provisioning system 308 is configured to determine a time and/or date when the provisioning information should be considered to be no longer valid. The device developer may make this determination by adding a predetermined time duration to a current date and or time. By way of example, the device developer provisioning system 308 may, in some embodiments, set the time or date stamp to expire one day after it is generated. In such embodiments, the wireless device 201 may be configured to ignore the provisioning information if the time or date stamp represents a time or date that is earlier than a current time or date.

The encrypted or otherwise secured provisioning information is sent from the device developer provisioning system 308 to the carrier provisioning system 306. From the carrier provisioning system 306, the encrypted or otherwise secured provisioning information is further sent to the wireless device 201.

It will be appreciated that the carrier provisioning system 306 comprises one or more servers coupled for communication with the wireless device 201. Carrier provisioning system 306 is further coupled for communication with other carrier infrastructure. In some embodiments, the carrier infrastructure may be coupled to a carrier billing system which may be used to track the date on which a wireless device 201 is enabled in order to initiate billing for wireless usage.

The carrier provisioning system 306 may comprise one or more servers containing at least one controller, such as a processor 341, and a memory 343. The carrier provisioning system 306 includes a first communication system 345 for communicating with the wireless device 201 through the wireless network equipment 304. The carrier provisioning system 306 includes a second communication system 347 for communicating with the device developer provisioning system 308. It will be appreciated that, in some embodiments, the first communication system 345 and the second communication system 347 may be the same system. That is, a single communication system may be used to communication with the wireless device 201 via the wireless network equipment 304 and also with the device developer provisioning system 308.

The device developer provisioning system 308 may also comprise one or more servers containing at least one controller, such as a processor 351, and a memory 353. The device developer provisioning system 308 also includes a communication system 355 for communicating with the carrier provisioning system 306.

Figure 4:
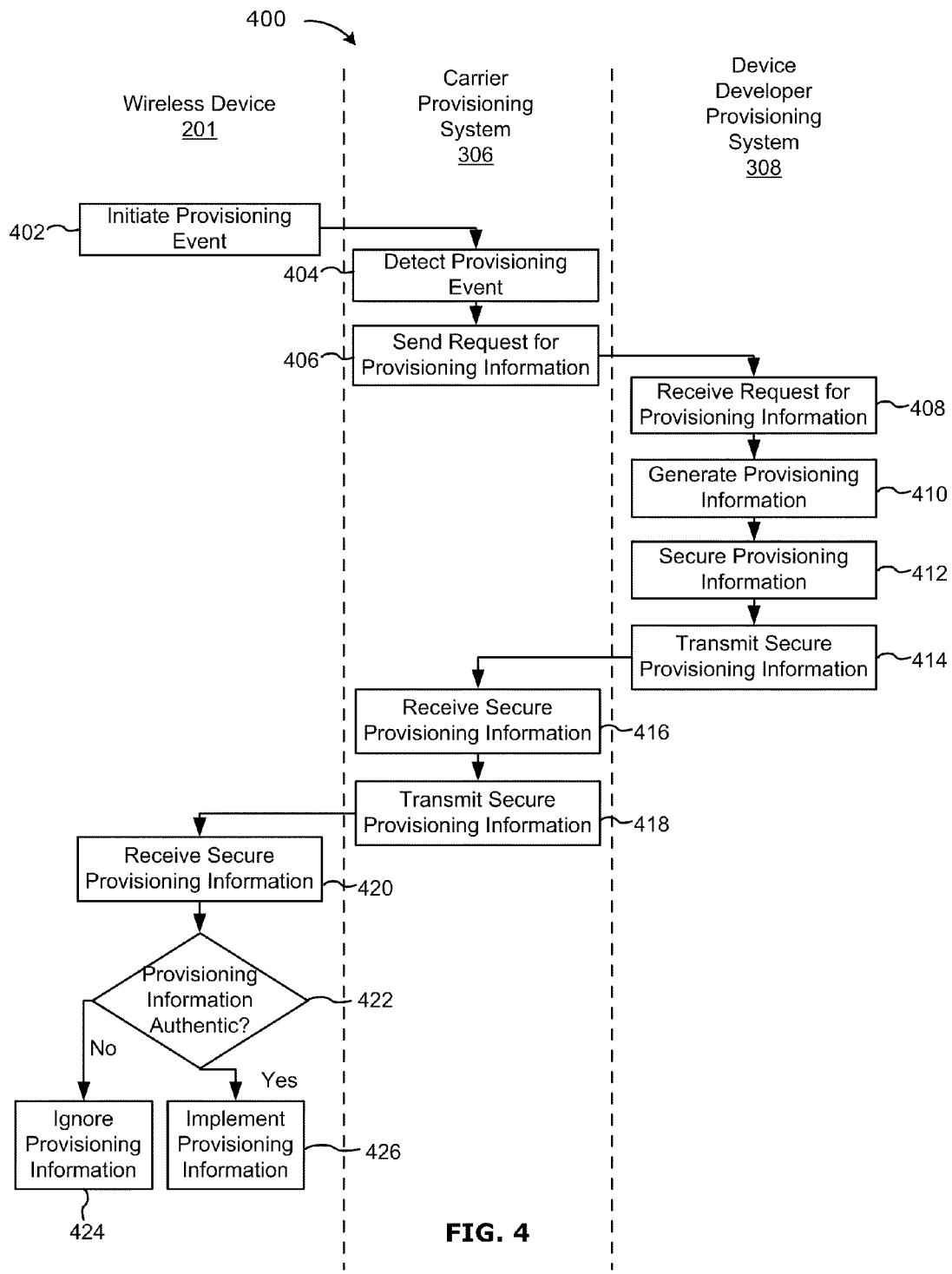
FIG. 4 is a flowchart illustrating a method for provisioning a wireless device in accordance with example embodiments of the present disclosure.

Reference will now be made to the flowchart of FIG. 4 which illustrates a provisioning procedure 400 in accordance with example embodiments of the present disclosure. The provisioning procedure 400 includes steps or operations which may be performed by the wireless device 201, steps or operations which may be performed by the carrier provisioning system 306 and steps or operations which may be performed by the device developer provisioning system 308. More specifically, one or more controller of the wireless device 201 (FIG. 2), such as the processor 240 (FIG. 2), may be configured to execute the wireless device 201 specific steps of the provisioning procedure 400. In some example embodiments, the provisioning module 226 (FIG. 2) of the wireless device 201 may contain instructions for the processor 240 for performing the wireless device 201 specific steps of the provisioning procedure 400. Similarly, one or more controller of the carrier provisioning system 306 (FIG. 3), such as the processor 341 (FIG. 3), may be configured to perform the carrier provisioning system specific steps or operations of the provisioning procedure 400. Similarly, one or more controller of the device developer provisioning system 308 (FIG. 3), such as the processor 351 (FIG. 3) may be configured to perform the device developer provisioning system 308 specific steps or operations of the provisioning procedure 400.

In the following discussion of FIG. 4, reference numerals which refer to wireless device specific components generally refer to components which are illustrated by way of example in FIG. 2. Similarly, reference numerals which refer to carrier provisioning system 306 components or device developer provisioning system components, generally refer to components which are illustrated by way of example in FIG. 3.

At step 402, a provisioning event is initiated by the wireless device 201. The provisioning event may be initiated, for example, when the wireless device 201 is powered on and first connects to network equipment 304 (FIG. 3) associated with a wireless carrier. In other embodiments, the provisioning event is initiated when a user connects to the network equipment 304 and requests, via the input mechanism 260 associated with the wireless device, that the wireless device 201 be provisioned. In other embodiments, other events may be used as a trigger for initiating a provisioning event.

The carrier provisioning system 306 may detect the provisioning event at step 404 and may, in response, initiate provisioning of the wireless device 201.

In some embodiments, during the provisioning procedure 400, the carrier provisioning system 306 may update parameters or settings on the wireless device 201. Some of the settings or parameters which the carrier provisioning system 306 may update may require the use of methods or algorithms which are unknown to the carrier provisioning system 306. That is, the carrier provisioning system 306 may not be equipped with algorithms which permit the carrier provisioning system 306 to generate provisioning information for the wireless device 201 to update the desired parameters or settings.

In order to update the parameters or settings on the wireless device 201, the carrier provisioning system 306 may, at step 406, send a request to a device developer provisioning system 308. The device developer provisioning system is a system which contains the algorithms necessary to generate the provisioning information which may be used by the wireless device 201 to update the parameters or settings on the wireless device.

In some embodiments, the device developer provisioning system may be configured to provide provisioning information of more than one type. For example, the device developer provisioning system may be configured to provide provisioning information to vary a first setting associated with the wireless device (i.e. a ping rate) and provisioning information to vary a second setting associated with the wireless device (i.e. a network address associated with a value added service provider). In such embodiments, the request from the carrier provisioning system 306 may include information which allows the device developer provisioning system 308 to determine the nature of the request. That is the request includes information which specifies the type of provisioning information that the carrier provisioning system 306 would like to receive from the device developer provisioning system 308.

For example, in some embodiments, the request may indicate that the carrier provisioning subsystem 306 is requesting to vary a network address which may be used by the device to connect to a value added service provider in order to use value added services on the wireless device 201.

The request may also include information which may be used by the device developer provisioning system 308 to generate provisioning information which is only usable by the specific wireless device 201 which is being provisioned. Such information may, for example, include identification information which identifies the wireless device 201. The identification information may be an identification number or other identifier (Such as a personal identification number or PIN) which is stored on the device at the time of manufacture of the wireless device 201. The identification information may be received at the carrier provisioning system 306 from the wireless device 201 and sent to the device developer provisioning system 308 at step 406.

In some embodiments, the request may also include an encryption key associated with the device 201. The encryption key corresponds to a decryption key stored on the wireless device 201. The carrier provisioning system 306 may receive the encryption key from the wireless device 201 and may send the encryption key to the device developer provisioning system 308 at step 406.

Next, at step 408, the request for the provisioning information is received at the device developer provisioning system 308.

In response to receiving the request, at step 410, the device developer provisioning system 308 may generate provisioning information corresponding to the request. The provisioning information may be generated in dependence on the identification information. That is, the provisioning information may be generated so that it may only be used to provision the specific wireless device 201 related to the request received at step 408.

The provisioning information is generated using a method or algorithm which is stored on the device developer provisioning system 308 and which is not known to the carrier provisioning system 306. That is, the specific method of generating the provisioning information is kept secret from the carrier provisioning system 306.

Next, at step 412, the provisioning information generated at step 410 may be further secured by the device developer provisioning system 308. In some embodiment, at step 412, the provisioning information generated at step 410 is secured, at least in part, by encrypting the provisioning information to create encrypted provisioning information.

The encryption may be performed using public or private encryption keys. As noted previously, in some embodiments where public key encryption is performed, a public encryption key may be received at the device developer provisioning system with the request at step 408. The received encryption key corresponds to a private decryption key stored on the wireless device 201. That is, the public encryption key may be asymmetric with the decryption key stored on the wireless device 201.

In other embodiments, the device developer provisioning system 308 may retrieve an encryption key corresponding to the decryption key on the wireless device 201 from a memory 353 associated with the device developer provisioning system 308. The device developer provisioning system 308 may retrieve an encryption key corresponding to the decryption key on the wireless device using the identification information identifying the wireless device 201 which is received with the request from the carrier provisioning system.

In such embodiments, the encryption key may be a public encryption key or a private encryption key which is known only to the device developer and the wireless device. The encryption key may be stored on the memory 353 associated with the device developer provisioning system 308 prior to sale of the wireless device 201 to its end user. For example, the encryption key may be stored on the memory at the time of manufacture of the wireless device along with the associated identification information.

Alternatively, or in addition to encryption, in some embodiments, at step 412, the provisioning information generated at step 410 may be signed using a digital signature. For example, the provisioning information generated at step 410 may be signed using a private key associated with the device developer provisioning system to create signed provisioning information. Once signed using a private key associated with the device developer provisioning system, the provisioning information may be authenticated using a public key associated with the device developer provisioning system 308. That is, a wireless device 201 which receives the signed provisioning information may use the public key in order to verify that the provisioning information came from the device developer provisioning system 308 and that the provisioning information has not been tampered with.

In some embodiments, to provide even greater security, the device developer provisioning system 308 is configured to include a time and/or date stamp in the provisioning information. The time and/or date stamp will, in some embodiments, indicate a time or date when the device developer provisioning system 308 handled the provisioning information. For example, in some embodiments, the time and/or date stamp will indicate the time and/or date when the provisioning information was generated. In such embodiments, the wireless device 201 may be configured to ignore provisioning information if the time and/or date stamp indicates that the provisioning information is too stale.

As noted previously, in other embodiments, the time or date stamp may take the form of an expiry date. In such embodiments, the device developer provisioning system 308 is configured to determine a time and/or date when the provisioning information should be considered to be no longer valid. The device developer may make this determination by adding a predetermined time duration to a current date and or time. By way of example, the device developer provisioning system 308 may, in some embodiments, set the time or date stamp to expire one day after it is generated. In such embodiments, the wireless device 201 may be configured to ignore the provisioning information if the time or date stamp represents a time or date that is earlier than a current time or date.

In at least some embodiments, the time and/or date stamp may be added to the provisioning information prior to encryption or authentication in order to ensure that the time and/or date stamp is not tampered with.

Thus, at step 412, one or more security measures may be used to secure the provisioning information against tampering or to keep the provisioning information confidential between the device developer provisioning system 308 and the wireless device 201. These security measures may include any one or combination of: encrypting the provisioning information; signing the provisioning information; and/or adding a time or date stamp to the provisioning information to produce secured provisioning information.

Next, at step 414, the encrypted or otherwise secured provisioning information is sent from the device developer provisioning system 308 to the carrier provisioning system 306 where it is received at step 416. From the carrier provisioning system 306, the encrypted or otherwise secured provisioning information is further sent to the wireless device 201 at step 418 where it is received at step 420.

In some embodiments (not shown), the carrier provisioning system 306 may generate further provisioning information in addition to the provisioning information received from the device developer provisioning system 308. The carrier generated provisioning information may also be sent to the wireless device 201 at step 418.

The received secured provisioning information may, in some embodiments, be authenticated at step 422. In some embodiments, the provisioning information may be authenticated to ensure that the provisioning information is not too old. This type of authentication may be performed by the wireless device 201 based on the time and/or date stamp included with the provisioning information. That is, the wireless device 201 may compare the current time and/or date with the time and/or date included in the provisioning information. The wireless device 201 may compare the difference between these times and/or dates and a predetermined threshold to determine if the received provisioning information is too old. For example, in some embodiments, where the provisioning information is stamped with a time and/or date indicating the time or date when it was generated by the device developer provisioning system 308, the wireless device may determine whether the difference between the current time and/or date and the time and/or date in the provisioning information exceeds a predetermined threshold. If it exceeds the threshold, the wireless device 201 may determine that the provisioning information is too old.

If the wireless device 201 determines that the provisioning information is too old, it may ignore the provisioning information (step 424).

In some embodiments, where the provisioning information is signed, the provisioning information may be authenticated to ensure that the provisioning information was transmitted from the device developer provisioning system 308. In at least some embodiments, the provisioning information is authenticated using a public key associated with the device developer provisioning system.

If, at step 422, the wireless device 201 determines that the provisioning information is authentic, then at step 426 it implements the provisioning information. Implementing the provisioning information may include storing the provisioning information in memory of the wireless device 201. In some embodiments, implementing the provisioning information includes varying a parameter, attribute or setting associated with the wireless device 201.

If, however, at step 422 the wireless device 201 determines that the provisioning information is not authentic (i.e. if the provisioning information is too old and/or the provisioning information was not sent from the device developer provisioning system), then at step 424, the wireless device 201 ignores the provisioning information.

In at least some embodiments, the data sent between the carrier provisioning system 306 and the wireless device 201 (i.e. the provisioning information) may be sent by way of Short Message Service messages.

Figure 5:
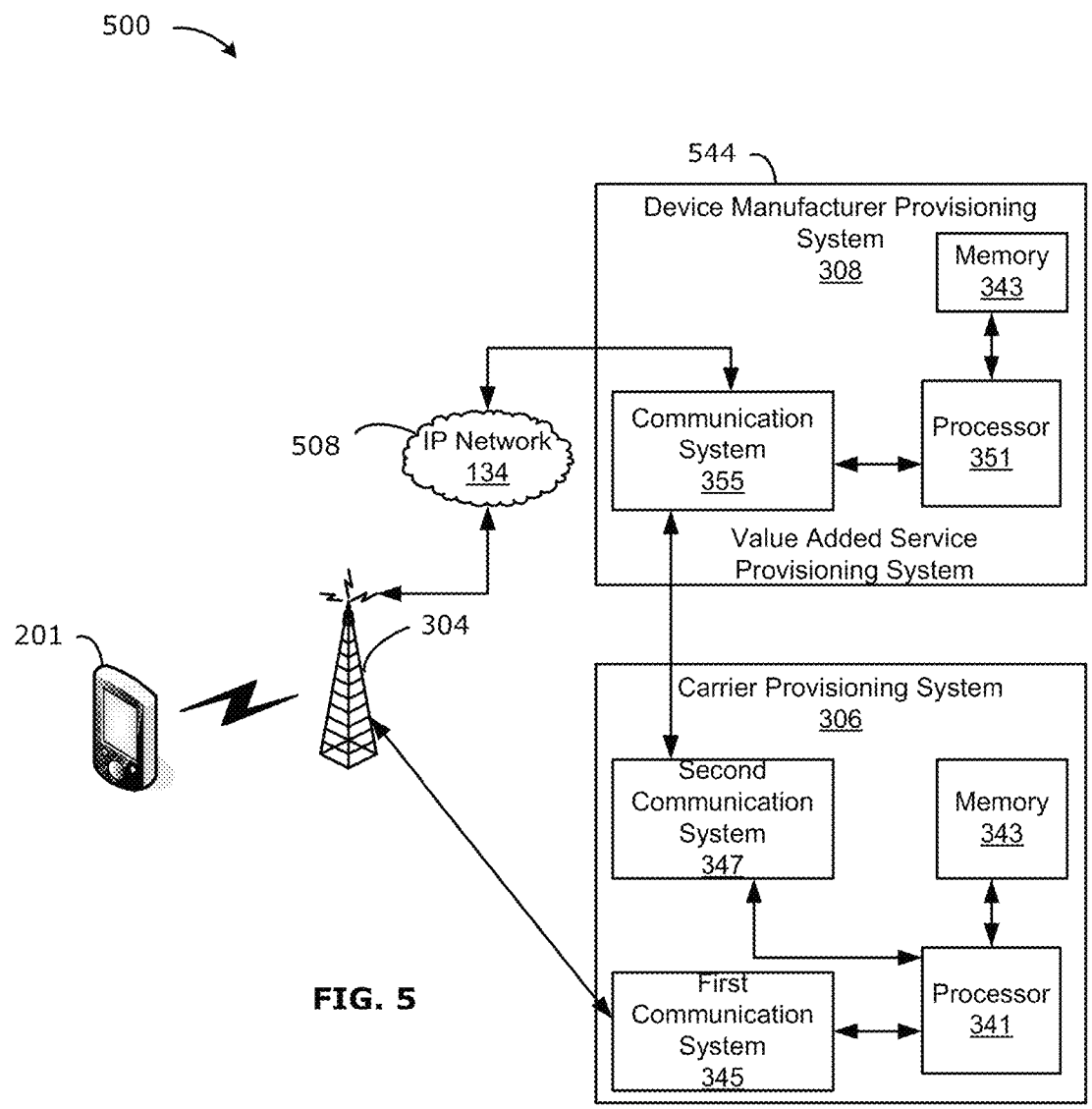
FIG. 5 is a block diagram of a provisioning system in accordance with example embodiments of the present disclosure.

Referring now to FIG. 5, a block diagram of a further embodiment of a wireless device 201 provisioning system 500 is illustrated. The wireless provisioning system 500 provisions the wireless device 201. The embodiment of FIG. 5 is similar to the embodiment of FIG. 3. However, in the embodiment of FIG. 5, the device developer provisioning system 308 is also a value added service provisioning system 544. The value added service provisioning system 544 is used, at least in part, to provision the wireless device to use value added services provided by a value added service provider.

The value added service provisioning system 544 may also be accessed by the wireless device 201 via an IP network accessible through the network equipment 304. More particularly, the value added service provisioning system is accessible using an IP address associated with the valued added service provisioning system 544 or with a gateway which connects the device 201 to the value added service provisioning system.

Figure 6:
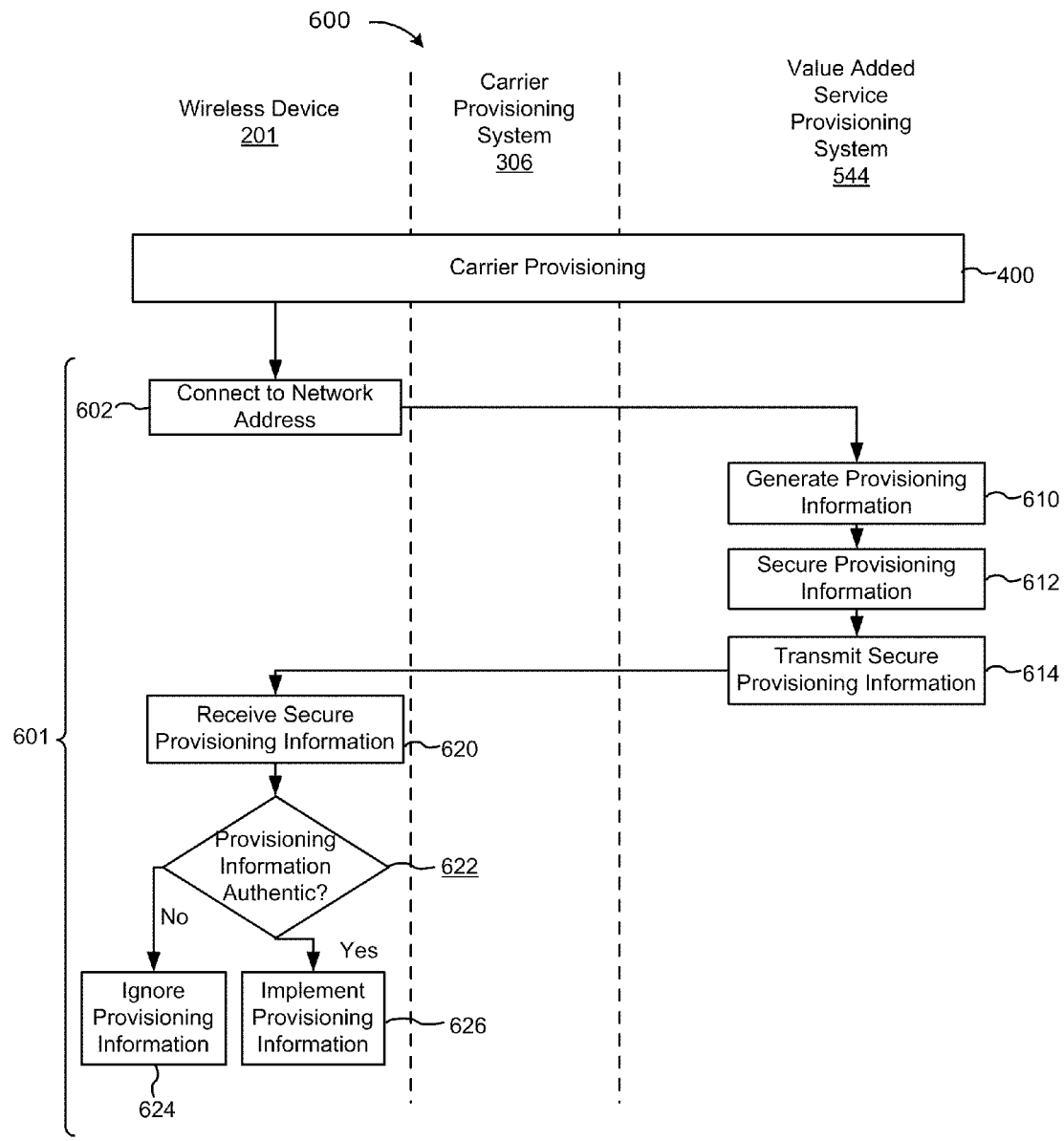
FIG. 6 is a flowchart illustrating a method for provisioning a wireless device in accordance with example embodiments of the present disclosure.

Referring now to FIG. 6, a flowchart of further example embodiments of provisioning procedures 600 is illustrated. The provisioning procedure 600 includes steps or operations which may be performed by the wireless device 201, steps or operations which may be performed by the carrier provisioning system 306 and steps or operations which may be performed by the value added service provisioning system 544 and/or the device developer provisioning system. More specifically, one or more controller of the wireless device 201 (FIG. 2), such as the processor 240 (FIG. 2), may be configured to execute the wireless device 201 specific steps of the provisioning procedure 600. In some example embodiments, the provisioning module 226 (FIG. 2) of the wireless device 201 may contain instructions for the processor 240 for performing the wireless device 201 specific steps of the provisioning procedure 600. Similarly, one or more controller of the carrier provisioning system 306 (FIG. 3), such as the processor 341 (FIG. 3), may be configured to perform the carrier provisioning system specific steps or operations of the provisioning procedure 600. Similarly, one or more controller of the value added service provisioning system 544 (FIG. 5), such as the processor 351 (FIG. 5) may be configured to perform the value added service provisioning system 544 specific steps or operations of the provisioning procedure 600.

In the following discussion of FIG. 6, reference numerals which refer to wireless device specific components generally refer to components which are illustrated by way of example in FIG. 2. Similarly, reference numerals which refer to carrier provisioning system 306 components or value added service provisioning system components generally refer to components which are illustrated by way of example in FIG. 5.

The provisioning process 600 of FIG. 6 includes two provisioning stages. More particularly, it includes a carrier provisioning stage and a value added service provisioning stage. The carrier provisioning is performed at step 400. Step 400 may be the same as the method 400 of FIG. 4. Step 400 may engage the wireless device 201, the carrier provisioning system 306 and the device developer provisioning system 308 (which is, in at least some embodiments, the same system as the value added service provisioning system 544).

Following the carrier provisioning, at step 601, value added service provisioning is performed. In some embodiments, the value added service provisioning is initiated, at step 602 when the wireless device 201 connects to the value added provisioning system 544. The wireless device 201 connects to the value added provisioning system 544 by connecting to a network address associated with the value added service provisioning system. The network address may, for example, be a network address which is pre-programmed into a memory of the wireless device 201; for example, at the time of manufacture of the device 201. In some embodiments, the network address may be a network address which was received at the wireless device during the carrier provisioning steps 400.

During the value added service provisioning steps 601, the wireless device 201 may connect directly to the value added service provisioning system 544 without using the carrier provisioning system as an intermediary.

In response to the device connecting (step 602) to the value added service provisioning system 544, the value added service provisioning system 544 may generate provisioning information (step 610) for the device 201 to enable one or more services on the device. The one or more services which are enabled may be determined by the value added service provisioning system 544 by communicating with the carrier provisioning system 306 to obtain information regarding the nature of the value added services which the wireless device 201 is permitted access to.

Next, at step 612, the provisioning information may be secured. The step 612 may be performed in the manner discussed previously with regard to step 412 of FIG. 4.

Next, at step 614, the secure provisioning information may be transmitted to the wireless device 201 and received at the wireless device 201 at step 620.

Next, at step 622, the wireless device 201 may determine whether the received provisioning information is authentic in the manner described above with reference to step 422 of FIG. 4.

If the wireless device 201 determines that the provisioning information is not authentic, then it may ignore the provisioning information (step 624). Alternatively, if the wireless device 201 determines that the provisioning information is authentic, at step 624 it may implement the provisioning information to enable access to the value added services.

It will be appreciated that, while FIG. 5 and FIG. 6 discuss embodiments where the value added service provisioning system and the device developer provisioning system are the same system, in other embodiments, the value added service provisioning system may be implemented on a difference system than the device developer provisioning system. For example, the device developer provisioning system may be used with the carrier provisioning system to implement the carrier provisioning of step 400 and the value added service provisioning system 544 may be used to implement the value added service provisioning step 601.

It will be appreciated that the methods 400 and 600, may be varied and that steps may be added or removed from these methods 400, 600.

In accordance with further example embodiments of the present disclosure, there are provided a computer program product comprising a computer readable medium having stored thereon computer executable instructions comprising instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

While the present disclosure is primarily described as a method, a person of ordinary skill in the art will understand that the present disclosure is also directed to various apparatus such as a wireless device for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may affect alterations, modifications and variations to the particular example embodiments without departing from the intended scope of the present disclosure. In particular, features from one or more of the above-described embodiments may be selected to create alternate embodiments comprised of a sub-combination of features which may not be explicitly described above. In addition, features from one or more of the above-described example embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of enabling one or more communication services on a wireless device, the method comprising:
   sending a request for provisioning information from a carrier provisioning system to a device developer provisioning system, the request indicating a setting on the wireless device that is to be varied by the provisioning information;
   receiving, from the device developer provisioning system, encrypted provisioning information corresponding to the request, wherein the encrypted provisioning information is generated using a private algorithm on the device developer provisioning system, wherein the private algorithm is an algorithm which is unknown to the carrier provisioning system, wherein the encrypted provisioning information contains a network time retrieved from a wireless network indicating a time and/or date when the provisioning information was generated and/or sent from the device developer provisioning system, added to the provisioning information prior to encryption, indicating currency of the provisioning information, and wherein the network time is useable by the wireless device to determine whether to implement the provisioning information, the encrypted provisioning information being ignored by the wireless device if the provisioning information is not current; and
   sending the encrypted provisioning information corresponding to the request from the carrier provisioning system to the wireless device.

2. The method of claim 1, wherein the provisioning information specifies a network address to which the wireless device may connect to enable at least one value added service.

3. The method of claim 2, further comprising:
connecting, by the wireless device, to the network address; and
enabling at least one value added service on the wireless device.

4. The method of claim 2 wherein the value added service includes any one or a combination of: email, internet services, instant messaging.

5. The method of claim 1, wherein the encrypted provisioning information is sent from the carrier provisioning system as a short message service (SMS) message.

6. The method of claim 1, wherein the encrypted provisioning information is digitally signed.

7. The method of claim 1, wherein the provisioning information specifies updated operating parameters for the wireless device.

8. The method of claim 1, further comprising:
generating, by the carrier provisioning system, further provisioning information; and
sending the further provisioning information from the carrier provisioning system to the wireless device.

9. The method of claim 1, wherein the encrypted provisioning information is encrypted with a public encryption key corresponding to a private key stored on the wireless device.

10. A method of enabling one or more communication services on a wireless device, the method comprising:
receiving, at a device developer provisioning system, a request from a carrier provisioning system for provisioning information to provision the wireless device, the request indicating a setting on the wireless device that is to be varied by the provisioning information, the carrier provisioning system being connected to the wireless device through a wireless network;
generating provisioning information using a private algorithm on the device developer provisioning system, wherein the private algorithm is an algorithm which is unknown to the carrier provisioning system;
encrypting the provisioning information to produce encrypted provisioning information, wherein the encrypted provisioning information contains a network time retrieved from the wireless network indicating a time and/or date when the provisioning information was generated and/or sent from the device developer provisioning system, added to the provisioning information prior to encryption, indicating currency of the provisioning information, and wherein the network time is useable by the wireless device to determine whether to implement the provisioning information, the encrypted provisioning information being ignored by the wireless device if the provisioning information is not current; and
sending the encrypted provisioning information from the device developer provisioning system to the carrier provisioning system for transmission to the wireless device.

11. The method of claim 10, wherein the provisioning information is encrypted with a public encryption key corresponding to a private key stored on the wireless device.

12. The method of claim 10, wherein the provisioning information specifies a network address to which the device may connect to enable at least one value added service.

13. The method of claim 10, wherein the encrypted provisioning information is digitally signed.

14. The method of claim 10, wherein the provisioning information specifies updated operating parameters for the wireless device.

15. A system for enabling one or more value added services on a wireless device comprising:
a carrier provisioning system comprising:
a first communication system for communicating with at least one wireless device;
a second communication system for communicating with a device developer provisioning system;
at least one processor, the at least one processor being configured to:
send a request for provisioning information to a device developer provisioning system, the request indicating a setting on the wireless device that is to be varied by the provisioning information;
receive, from the device developer provisioning system, encrypted provisioning information corresponding to the request, wherein encrypted provisioning information is generated using a private algorithm on the device developer provisioning system, wherein the private algorithm is an algorithm which is unknown to the carrier provisioning system, wherein the encrypted provisioning information contains a network time retrieved from a wireless network indicating a time and/or date when the provisioning information was generated and/or sent from the device developer provisioning system, added to the provisioning information prior to encryption, indicating currency of the provisioning information, and wherein the network time is useable by the wireless device to determine whether to implement the provisioning information, the encrypted provisioning information being ignored if the provisioning information is not current; and
send the encrypted provisioning information corresponding to the request from the carrier provisioning system to the wireless device.

16. The system of claim 15 further comprising:
a device developer provisioning system comprising:
a communication system for communicating with the carrier provisioning system; and
at least one processor, the at least one processor being configured to:
receive a request from the carrier provisioning system for provisioning information to provision the wireless device;
generate provisioning information using the private algorithm associated with the device developer provisioning system;
encrypt the provisioning information to produce secure provisioning information; and
send the secure provisioning information to the carrier provisioning system.

17. The system of claim 15, wherein the provisioning information is encrypted with a public encryption key corresponding to a private key stored on the wireless device.

18. The system of claim 15, wherein the provisioning information specifies a network address to which the device may connect to enable at least one value added service.

19. The system of claim 15, wherein the encrypted provisioning information is digitally signed.

20. The system of claim 15, wherein the encrypted provisioning information is sent from the carrier provisioning system as a short message service (SMS) message.

21. The system of claim 15, wherein the provisioning information specifies updated operating parameters for the wireless device.

22. A system for enabling one or more value added services on a wireless device comprising:
- a device developer provisioning system comprising:
  - a communication system for communicating with a carrier provisioning system; and
  - at least one processor, the at least one processor being configured to:
    - receive a request from a carrier provisioning system for provisioning information to provision the wireless device, the carrier provisioning system being connected to the wireless device through a wireless network;
    - generate provisioning information using a private algorithm on the device developer provisioning system, wherein the private algorithm is an algorithm which is unknown to the carrier provisioning system;
    - encrypt the provisioning information to produce encrypted provisioning information, wherein the encrypted provisioning information contains a network time retrieved from a wireless network indicating a time and/or date when the provisioning information was generated and/or sent from the device developer provisioning system, added to the provisioning information prior to encryption, indicating currency of the provisioning information, and wherein the network time is useable by the wireless device to determine whether to implement the provisioning information, the encrypted provisioning information being ignored by the wireless device if the provisioning information is not current; and
    - send the encrypted provisioning information from the device developer provisioning system to the carrier provisioning system for transmission to the wireless device.

23. The system of claim 22 further comprising:
the carrier provisioning system comprising:
- a first communication system for communicating with at least one wireless device;
- a second communication system for communicating with a device developer provisioning system;
- at least one processor, the at least one processor being configured to:
  - send a request for provisioning information to the device developer provisioning system;
  - receive, from the device developer provisioning system, the encrypted provisioning information corresponding to the request; and
  - send the encrypted provisioning information corresponding to the request from the carrier provisioning system to the wireless device.

24. A non-transitory machine readable medium having tangibly stored thereon executable instructions for execution by a processor of an electronic device, wherein the executable instructions, when executed by the processor of the electronic device, cause the processor to:
- send a request for provisioning information from a carrier provisioning system to a device developer provisioning system, the request indicating a setting on a wireless device that is to be varied by the provisioning information;
- receive, from the device developer provisioning system, encrypted provisioning information corresponding to the request, wherein the encrypted provisioning information is generated using a private algorithm on the device developer provisioning system, wherein the private algorithm is an algorithm which is unknown to the carrier provisioning system, wherein the encrypted provisioning information contains a network time retrieved from a wireless network indicating a time and/or date when the provisioning information was generated and/or sent from the device developer provisioning system, added to the provisioning information prior to encryption, indicating currency of the provisioning information, and wherein the network time is useable by the wireless device to determine whether to implement the provisioning information, the encrypted provisioning information being ignored by the wireless device if the provisioning information is not current; and
- send the encrypted provisioning information corresponding to the request from the carrier provisioning system to the wireless device.

25. A non-transitory machine readable medium having tangibly stored thereon executable instructions for execution by a processor of an electronic device, wherein the executable instructions, when executed by the processor of the electronic device, cause the processor to:
- receiving, at a device developer provisioning system, a request from a carrier provisioning system for provisioning information to provision a wireless device, the request indicating a setting on the wireless device that is to be varied by the provisioning information, the carrier provisioning system being connected to the wireless device through a wireless network;
- generating provisioning information using a private algorithm on the device developer provisioning system, wherein the private algorithm is an algorithm which is unknown to the carrier provisioning system;
- encrypting the provisioning information to produce encrypted provisioning information, wherein the encrypted provisioning information contains a network time retrieved from the wireless network indicating a time and/or date when the provisioning information was generated and/or sent from the device developer provisioning system, added to the provisioning information prior to encryption, indicating currency of the provisioning information, and wherein the network time is useable by the wireless device to determine whether to implement the provisioning information, the encrypted provisioning information being ignored by the wireless device if the provisioning information is not current; and
- sending the encrypted provisioning information from the device developer provisioning system to the carrier provisioning system for transmission to the wireless device.

* * * * *